April 8, 1924.  1,489,403

R. B. WASDELL

BALL VALVE FOR CISTERNS

Filed Nov. 7, 1921

Inventor-
Richard Benjamin Wasdell,
By B. Singer,
Atty.

Patented Apr. 8, 1924.

1,489,403

UNITED STATES PATENT OFFICE.

RICHARD BENJAMIN WASDELL, OF EDGBASTON, BIRMINGHAM, ENGLAND.

BALL VALVE FOR CISTERNS.

Application filed November 7, 1921. Serial No. 513,564.

*To all whom it may concern:*

Be it known that I, RICHARD BENJAMIN WASDELL, a subject of the Kingdom of Great Britain, residing at Waterworks Road, Edgbaston, Birmingham, in the county of Warwick, England, have invented certain new and useful Improvements in Ball Valves for Cisterns, of which the following is a specification.

This invention relates to ball valves such as are used in cisterns for automatically arresting the supply of water when same has reached a predetermined level and the invention relates to the type of valve involving a downwardly directed aperture or depending supply nozzle and a pivotally mounted ball lever having a valve adapted to cover and close the aperture or extreme end of the depending nozzle and a flange or hood surrounding the nozzle to direct the water downwardly.

The present invention has for its object to prevent the splashing of water on to the ball lever with consequent spraying over the top of an open cistern and accordingly said lever is especially adapted for the passage of the water from the depending nozzle or downwardly directed aperture to the cistern whereby little or no obstruction is offered to the water by any face or part of the lever likely to set up splashing during its passage into the cistern.

Accordingly that part of the lever adjacent the valve has its upper edge formed to a knife edge or configuration or, alternatively, an aperture or passage may be provided in the lever adjacent the valve with or without a knife edge upon said lever for the purpose aforestated.

In order that this invention may be clearly understood and readily carried into practice, reference may be had to the appended explanatory sheet of drawings, upon which:—

Figure 1:
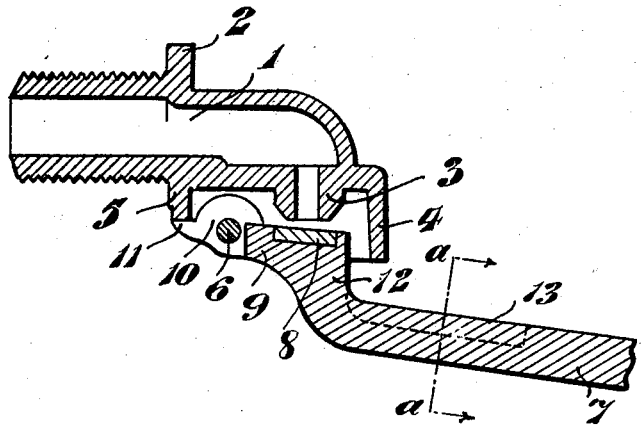
Figure 1 is a longitudinal section through a ball valve constructed according to one form of the present invention.
Figure 3:
Figure 3 is a transverse section taken on lines *a a* of Figures 1 and 2.

In an embodiment of the present invention the apparatus involves a horizontal water inlet or passage 1 provided with an external annular abutment flange 2 and said passage terminates in a short depending nozzle 3. A hood or flange 4 cast integrally with the inlet passage 1 and nozzle 3 surrounds the latter member and is formed integrally with a small flange 5 having a horizontal bottom edge. In this manner a small inverted compartment is formed for the depending nozzle 3. Each side of the hood or flange is perforated adjacent the flange 5 to form a bearing for a transverse pin or axis member 6 upon which the ball lever 7 is adapted to hinge the ball not being shown. The valve involves a rubber washer 8 inserted in a circular metallic disc 9 which is integral with perforated projections 10 adapted to operate upon the aforementioned pin or axis member 6 and said projections in turn are provided with abutments 11 adapted to bear against the horizontal bottom edge of the small transverse flange 5 aforementioned. The circular metallic disc 9 is substantially accommodated within the hood or flange 4 aforementioned and is integral with the ball lever 7 which firstly extends downwardly at 12 and then substantially horizontally when the valve is closed, that is when the rubber washer 8 is bearing against the depending nozzle 3. The upper part of the ball lever 7 adjacent the metallic disc 9 for some small distance along the length of the said lever is constructed to a knife or sharp edge construction 13 illustrated particularly in Figure 3, to prevent any splashing of the water passing around the said lever. In operation when the valve is thrown open by the lowering of the ball, as shewn in the Figure 1, the lower extremity of the depending nozzle is opened and the water allowed to flow between the metallic disc 9 and the hood or flange 4 and thence into the cistern, that part of the water passing around the ball lever 7 being prevented from splashing on account of the knife edge construction 13 aforementioned. The downward movement of the ball lever is limited by the abutments 11 contacting the small transverse flange 5 as shewn in the illustration.

Figure 2:
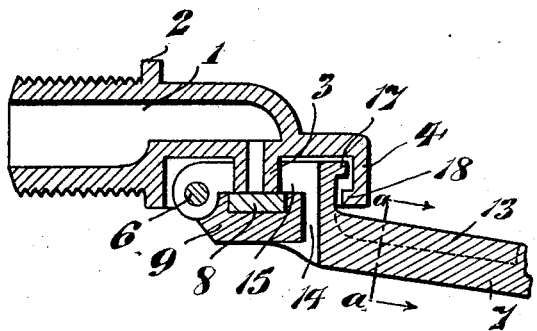
Figure 2 is a longitudinal section through a modified ball valve according to this invention.

In another embodiment of the present invention illustrated in Figure 2 a horizontal water inlet or passage 1 having an annular external abutment flange 2 is employed and said passage terminates in a short depending nozzle 3 adapted to be closed by the valve 8 as in the previous modification. A hood or flange 4 as in the previous modification is also provided around the depending nozzle 3 and is formed integral with the abutment flange 2 to constitute a hollow inverted box-like construction adapted to direct the water downwardly. The ball lever 7 is hingedly connected between the opposite sides of this hood or flange by a suitable split pin or axis member 6 and is also provided with an integral disc part 9 carrying the rubber valve 8 adapted to close the depending nozzle 3. An aperture 14 is left between the metallic disc 9 and adjacent extremity of the ball lever 7 which extremity is connected to the said disc by two side limbs or elements 15. These side elements or limbs 15 are united by a vertical web 16 cast integral with the ball lever 7 and which web is provided at its upper extremity with a small flange 17 adapted to co-operate with an inwardly directed rib 18 on the lower edge of the hood or flange 4 of the apparatus to limit the downward movement of the ball lever. In operation when the valve is opened the water from the nozzle 3 passes through the aperture 14 aforementioned in the ball lever 7 to the cistern and during the movement of that lever some of the water is allowed to pass over the vertical web 16 and between the flange 17 and inwardly directed rib 18 on the hood or flange 4. This water passing between the flange and rib is prevented from splashing upon the ball lever 7 by forming the upper edge of same adjacent the vertical web to a knife edge or equivalent construction at 13 as in the previous modification.

What I claim as my invention and desire to secure by Letters Patent is:

In a ball valve for cisterns of the type referred to, a ball lever having on its upper side a valve and having its upper side adjacent the valve formed to a knife edge.

In witness whereof I have hereunto set my hand.

RICHARD BENJAMIN WASDELL.